United States Patent
Wendland et al.

(10) Patent No.: US 10,421,872 B1
(45) Date of Patent: Sep. 24, 2019

(54) STAIN RESISTANT COATING COMPOSITION

(71) Applicant: The Sherwin-Williams Company, Cleveland, OH (US)

(72) Inventors: Tom Wendland, Strongsville, OH (US); Philip J Ruhoff, Shaker Heights, OH (US); Richard R Chamberlain, Solon, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 15/260,350

(22) Filed: Sep. 9, 2016

Related U.S. Application Data

(60) Provisional application No. 62/215,969, filed on Sep. 9, 2015.

(51) Int. Cl.
*C09D 5/16* (2006.01)
*C09D 133/06* (2006.01)

(52) U.S. Cl.
CPC ....... *C09D 5/1668* (2013.01); *C09D 133/062* (2013.01)

(58) Field of Classification Search
CPC .......................... C09D 5/1668; C09D 133/062
See application file for complete search history.

(56) References Cited

U.S. PATENT DOCUMENTS

| | | | | |
|---|---|---|---|---|
| 2003/0001130 A1* | 1/2003 | Qiu | ........................ | C07C 311/09 252/8.62 |
| 2005/0171279 A1* | 8/2005 | Cote | .................... | C08G 18/283 524/871 |
| 2007/0135567 A1* | 6/2007 | Ruhoff | ................. | C09D 133/14 525/55 |
| 2007/0231496 A1* | 10/2007 | Eriksson | ................. | C23C 22/34 427/407.1 |

* cited by examiner

*Primary Examiner* — Peter D. Mulcahy
(74) *Attorney, Agent, or Firm* — Vivien Y. Tsang; Daniel A. Sherwin; Daniel S. Ward

(57) ABSTRACT

The invention relates to acrylic emulsion comprising between 0.1 and 10% of at least one fluoromonomer, at least one polymerizable phosphate functional monomer, and at least one wet adhesion monomer. The combination of the fluoromonomer with a polymerizable phosphate functional monomer and wet adhesion adhesion monomer act together to greatly improve the stain resistance of the acrylic emulsion.

12 Claims, No Drawings

STAIN RESISTANT COATING COMPOSITION

CROSS-REFERENCE TO RELATED APPLICATIONS

This application claims the benefit of U.S. provisional application No. 62/215,969 filed on Sep. 9, 2015, the entirety of which is hereby incorporated by reference.

BACKGROUND

Stain resistance, especially liquid stain repellency, is one of the key performance requirements for coating films. Stain resistance including resistance to being wetted by liquid stain, resistance to being adhered by stains, and/or ease of stain removal.

Stain resistance is achievable by the appropriate selection of binders and additives in a coating formulation. The latex paints of this invention can produce films which exhibit outstanding stain-resistance and washability to both surface and penetrating types of stains. The binder resins, in the practice of this invention, are the copolymerization products of a mixture of comonomers and which comprises a fluorine-containing unsaturated monomer, and a polymerizable phosphate functional monomer and a wet adhesion monomer.

DESCRIPTION OF THE INVENTION

The emulsion polymers used in formulating the latex paints for this invention are all-acrylic copolymers comprising alkyl esters of acrylic and methacrylic acid; or they are vinyl-acrylic polymers comprising vinyl-containing monomers; or styrene-acrylic polymers comprising alkyl esters of acrylic and methacrylic acid and styrene or $C_1$-$C_4$-substituted styrene. The procedures used to prepare the emulsions are well known in the art and generally involve admixing under rapid stirring the comonomer charge with water, surfactants or emulsifying agent, a polymerization initiator or catalyst, and, in most cases, a protective colloid-forming substance. The mixture is then heated to polymerization temperature for the time required to substantially complete the emulsion polymer formation. Many variations of the general preparative procedure are used to obtain, for example, lower viscosity, high solids content, improved freeze-thaw stability, etc.

As used herein, the expression "all acrylic copolymer" shall mean copolymers derived from the copolymerization of esters derived from the reaction of monohydric alcohols with acrylic acid or lower alkyl-substituted acrylic acid, optionally, together with minor amounts of other comonomers. Polymers can also include multifunctional acrylates. The expression "multifunctional acrylate" shall be understood herein to mean the esters derived from the reaction of a polyhydric alcohol with acrylic acid and/or lower alkyl-substituted acrylic acid, there being at least two hydroxyl groups of the alcohol esterified with the aforesaid acids.

In addition to the aforesaid acrylate and alkyl acrylate comonomers, the monomer charge may include relatively small amounts of one or more copolymerizable modifiers such as acrylic acid or lower alkyl-substituted acrylic acid, e.g., methacrylic acid (to introduce cross-linkable pendant carboxylic groups into the copolymer backbone), hydroxy-alkyl esters of acrylic acid or lower alkyl-substituted acrylic acid such as 2-hydroxyethyl acrylate, 2-hydroxypropyl acrylate, 3-hydroxypropyl methacrylate, etc. (to introduce cross-linkable pendant hydroxyl groups into the copolymer backbone), and an acrylic acid amide or lower alkyl-substituted acrylic acid amide such as hydroxymethylene diacetone acrylamide, or diacetone acrylamide (DAAM) with adipic acid dihydrazide (ADH) crosslinking agent. Such comonomers can be included in the charge at up to about 20%, and preferably from about 1% to about 5% of the weight of said charge.

Also suitable are ethylenically unsaturated monomers such as styrenated monomers, or vinyl esters, can be used as co-monomers. Examples of (meth)acrylates include various ($C_1$-$C_{20}$) alkyl or ($C_3$-$C_{20}$) alkenyl esters of (meth)acrylic acid; for example, methyl (meth)acrylate, ethyl (meth)acrylate, n-propyl (meth)acrylate, isopropyl (meth)acrylate, n-butyl (meth)acrylate, isobutyl (meth)acrylate, pentyl (meth)acrylate, 2-ethylhexyl (meth)acrylate, decyl (meth)acrylate, dodecyl (meth)acrylate, stearyl (meth)acrylate, α-chloroethyl (meth)acrylate, cyclohexyl (meth)acrylate, phenyl (meth)acrylate, methoxyethyl (meth)acrylate, ethoxyethyl (meth)acrylate, methoxypropyl (meth)acrylate, ethoxypropyl (meth)acrylate lauryl acrylate, methyl methacrylate, butyl methacrylate, ethyl methacrylate, isodecyl methacrylate, and lauryl methacrylate. The expression (meth)acrylic acid is intended to serve as a generic expression embracing both acrylic and methacrylic acid. Similarly, the expression (meth)acrylate is intended as a generic expression embracing both acrylic acid and methacrylic acid esters. Examples of styrenated monomers include styrene, alkylstyrenes (e.g., α-ethylstyrene, α-methylstyrene, vinyl toluene, 2,4-dimethylstyrene, 4-tert-butylstyrene, and the like), and halostyrenes (e.g., α-bromostyrene, 2,6-dichlorostyrene, and the like). Examples of vinyl esters include vinyl carboxylate alkyl ethers (e.g., vinyl acetate, vinyl propionate, vinyl butyrates, vinyl benzoates, vinyl esters of versatic acid or 2-ethylhexanoic acid (commercially available under the tradename VeoVa™ from Hexion Inc.), halo-substituted versions thereof such as vinyl chloroacetate, and the like. Other ethylenically unsaturated monomers that can be used as co-monomers include carboxylic group-containing of monomers, hydroxyl group-containing monomers, amide group-containing monomers, and amino group-containing monomers.

Multifunctional acrylate polymerization promoters can be used that are copolymerizable with the acrylate comonomers (and other comonomers, if present) and thus constitute part of the comonomer charge. The preferred promoters are esters of aliphatic and cycloaliphatic polyols and acrylic and/or methacrylic acid.

The alkyl acrylate comonomers which are copolymerized herein are preferably selected from esters derived from the reaction of a lower alkanol with acrylic acid or methacrylic acid, examples of which are: methyl acrylate, ethyl acrylate, propyl acrylate, n-butyl acrylate, isobutyl acrylate, 2-ethylhexyl acrylate, methyl methacrylate, ethyl methacrylate, propyl methacrylate, n-butyl methacrylate, isobutyl methacrylate, 2-ethylhexyl methacrylate, and the like. Mixtures of an alkyl acrylate and alkyl methacrylate are preferred, and of said mixtures, a combination of 2-ethylhexyl acrylate and methyl methacrylate is especially preferred. The 2-ethylhexyl acrylate is generally present at from about 30% to about 60%, and preferably from about 40% to about 60%, of the weight of the total comonomer charge. The methyl methacrylate is suitably employed at a level of from about 20% to about 60%, and preferably from about 30% to about 50%, of the weight of the total comonomer.

In accordance with this invention, a fluoromonomer, such as a fluorine-containing unsaturated monomer, is used, which can be selected from one or more of the following combination of monomers: chlorotrifluoroethylene or a fluorine-containing monomer having the structure (I):

   FORMULA (I)

Wherein R is hydrogen or methyl, n is an integer in the range of from 0-20, and $R_f$ is a fluoroalkyl group having in the range of 1 to 20 carbon atoms. Examples of suitable fluoromonomers according to formula (I) can include, for example, 2,2,2-trifluoroethyl (meth)acrylate, perfluoromethylethyl (meth)acrylate, perfluoroethylethyl (meth)acrylate, perfluorobutylethyl (meth)acrylate, perfluoropentylethyl (meth)acrylate, perfluorohexylethyl (meth)acrylate, perfluorooctylethyl (meth)acrylate, perfluorodecylethyl (meth)acrylate, perfluorolaurylethyl (meth)acrylate, perfluorostearylethyl (meth)acrylate, heptafluorobutyl (meth)acrylate, octafluoropentyl (meth)acrylate, hexafluorobutyl (meth)acrylate or combinations thereof. For example, trifluoroethyl methacrylate (tradename FLUORESTER) is commercially available from Tosoh Corporation, and octafluoropentyl (meth)acrylate (tradename 8-FM) is commercially available from San Ester Corp. The fluoromonomers are generally used herein at from about 0.1% to about 10.0%, preferably about 0.5% to about 5%, of the weight of the total comonomer charge. Levels of fluoromonomers greater or lesser than this can also be used to good effect depending upon the nature of the charge and the particular reaction conditions employed.

The polymerizable phosphate-functional monomer employed in accordance with this invention can be selected from the group consisting of: (a) dihydrogen phosphate-functional monomers, or (b) one or more phosphate monomers having at least one diester group; or (c) one or more phosphonate monomers, such as a vinyl or allyl phosphonate; or (d) ethylenically unsaturated (hydroxy) phosphinyl alkyl (meth)acrylate monomers; or (e) phosphoalkyl (meth)acrylates; or (f) phosphoalkyloxy (meth)acrylates, where (meth)acrylate designates methacrylate or acrylate; or a combination thereof. The dihydrogen phosphate-functional monomers can be dihydrogen phosphate esters of an alcohol in which the alcohol also contains a polymerizable vinyl or olefinic group, such as allyl phosphate, mono- or diphosphate of bis(hydroxy-methyl) fumarate or itaconate, derivatives of (meth)acrylic acid esters, such as, for example, phosphates of hydroxyalkyl(meth)acrylates including 2-hydroxyethyl (meth)acrylate, 3-hydroxypropyl (meth)acrylates, and the like.

Commercial examples are the phosphate methacrylates SIPOMER™ PAM-100, SIPOMER™ PAM-200, and SIPOMER™ PAM-4000 and the acrylate, SIPOMER™ PAM-300, available from Solvay Inc. Other suitable phosphate-functional monomers are phosphonate functional monomers, disclosed in WO 99/25780 A1, and include vinyl phosphonic acid, allyl phosphonic acid, 2-acrylamido-2-methylpropanephosphonic acid, α-phosphonostyrene, 2-methylacrylamido-2-methylpropanephosphonic acid, mono or bis-(hydrocarbyl or halohydrocarbyl)vinyl or allylphosphonates such as mono(ethyl)vinyl acid phosphonate, mono(butyl)vinyl acid phosphonate, mono(octyl)vinyl acid phosphonate, mono(cyclohexyl)vinyl acid phosphonate, mono(phenyl)vinyl acid phosphonate, mono(benzyl)vinyl acid phosphonate, mono(omega-chloroethyl)vinyl acid phosphonate, mono(omega-chlorooctyl) vinyl acid phosphonate, bis (ethyl) vinyl phosphonate, bis(butyl) vinyl phosphonate, bis (benzyl) vinyl phosphonate, bis(omega-chloroethyl)vinyl phosphonate, bis(omegachlorobutyl)vinyl phosphonate, bis(omega-chloroethyl) allyl phosphonate, bis (benzyl)allyl phosphonate and bis(cyclohexyl) allyl phosphonate.

Further suitable phosphorus functional monomers are 1,2-ethylenically unsaturated (hydroxy)phosphinylalkyl (meth)acrylate monomers, disclosed in U.S. Pat. No. 4,733,005, and include (hydroxy)phosphinylmethyl methacrylate. Preferred phosphate-functional monomers are dihydrogen phosphate monomers, which include 2-phosphoethyl (meth)acrylate, 2-phosphopropyl (meth)acrylate, 3-phosphopropyl (meth)acrylate, and 3-phospho-2-hydroxypropyl (meth)acrylate. Preferred are 2-phosphoethyl (meth)acrylate, 2-phosphopropyl (meth)acrylate, 3-phosphopropyl (meth)acrylate, 3-phospho-2-hydroxypropyl (meth)acrylate, SIPOMER™ PAM-100, Harcryl 1228-HEMA Phosphate monomer, and SIPOMER™ PAM-200. Preferably, the polymerizable phosphate-functional monomer can be selected from one or more of a combination of monomers and employed at levels of from about 0.1% to about 5%, and in certain embodiments, up to 3%, of the weight of total monomers present.

Ethylenically unsaturated phosphorus containing monomers can include, but are not limited to, phosphoalkyl (meth)acrylates such as phosphoethyl (meth)acrylate, phosphopropyl (meth)acrylate, and phosphobutyl (meth)acrylate where (meth)acrylate designates methacrylate or acrylate; phosphoalkoxy (meth)acrylates such as phospho-ethylene glycol (meth)acrylate, phosphodi-ethylene glycol (meth)acrylate, phosphotriethylene glycol (meth)acrylate, phosphopropylene glycol (meth)acrylate, phosphodipropylene glycol (meth)acrylate, phosphotri-propylene glycol (meth)acrylate where (meth)acrylate designates methacrylate or acrylate; phosphoalkyl (meth)acrylamides such as phosphoethyl (meth)acrylamide, phosphopropyl (meth)acrylamide where (meth)acrylamide designates methacrylamide or acrylamide; phosphoalkyl crotonates, phosphoalkyl maleates, phosphoalkyl fumarates, phosphodialkyl (meth)acrylates, phosphodialkyl crotonates, vinyl phosphates and (meth) allyl phosphate. Preferred is selected from phosphoalkyl (meth)acrylates or phosphoalkoxy(meth)acrylates, or the salts thereof, especially, phosphoethyl methacrylate. It is also contemplated that the copolymerized ethylenically unsaturated phosphorus containing monomer may be formed after the polymerization of at least one ethylenically unsaturated nonionic monomer and a phosphorus-capable precursor monomer. A phosphorus-capable precursor monomer is a monomer that has a reactive group that is capable, after polymerization, of reacting with a phosphorus-containing compound to yield a phosphorus-containing functional group attached to the polymer. For example, a polymer containing, as a polymerized unit, hydroxyethyl methacrylate which may then be reacted, as is well known in the art, to form, for example, phosphoethyl methacrylate. Similarly, for example, a polymerized carboxylic acid unit may then be reacted, as is well known in the art, with an epoxy phosphate or an amino phosphate.

In order to enhance the washability and wet adhesion properties of the ultimate final latex coating, the monomer composition comprises at least one wet adhesion monomer, or a combination of wet adhesion monomers. These monomers are well known in the art and include ethylenically unsaturated amino-, urea- and ureido-functionalized monomers such as dimethylaminoethyl acrylate and methacrylate, dimethylaminopropyl acrylate and methacrylate, 3-dimethylamino-2,2-dimethylpropyl-1-acrylate and methacrylate, 2-N-morpholinoethyl acrylate and methacrylate, 2-N-piperidinoethyl acrylate and methacrylate, N-(3-dimethylaminopropyl) acrylamide and methacrylamide, N-(3-dimethylamino-2, 2-dimethylpropyl) acrylamide and methacrylamide, N-dimethylaminomethyl acrylamide and methacrylamide, N-dimethylaminomethyl acrylamide and methacrylamide, N-(4-morpholino-methyl) acrylamide and methacrylamide, vinylimidazole, vinylpyrrolidone, N-(2-methacryloyloxyethyl) ethylene urea, N-(2-methacryloxyacetamidoethyl)-N,N'-ethyleneurea, allylalkyl ethylene urea, N-methacrylamidomethyl urea, N-methacryoyl urea, N-(2-methacryloyloxyethyl) ethylene urea (for example, VISIOMER® MEEU, Evonik), 2-(1-imidazolyl) ethyl methacrylate, N-(methacrylamido)ethyl ethylene urea (for example, Sipomer WAM II, Rhodia) and allyl ureido wet adhesion monomer (for example, Sipomer WAM, Rhodia). The wet adhesion monomer may be present in an amount from 0.2% to 8.0% by weight of the total polymer.

The latex emulsion composition of this invention comprises:
  i. 0-60 weight percent of a styrene-based monomer;
  ii. 10 to 90 weight percent of one or more (meth)acrylic monomers;
  iii. 0-60 weight percent of a vinyl-based monomer;
  iv. 0.5 to 10 weight percent of a fluorine-containing unsaturated monomer;
  v. 0.1 to 5 weight percent, of a polymerizable phosphate-functional monomer;
  vi. 0.1 to 8 weight percent of a wet adhesion monomer; all based on the total weight of monomers.

Further, the polymer has a glass transition temperature Tg of at least −10° C. as calculated with the Fox formula and is preferably in the range at least −10 to 35° C., preferably 0 to 25° C.

Latex resins based upon the invention may be successfully prepared by conventional polymerization processes. In one embodiment, a single stage polymerization process can be used.

In one embodiment of an all-acrylic latex emulsion copolymers, it is preferred to add the monomer mixture, including the fluoromonomer, to an aqueous surfactant-containing solution with adequate stirring to obtain a stable pre-emulsion which is then added to the polymerization reaction medium containing the acrylate polymerization initiator and preheated to reaction temperature. The addition of the pre-emulsion of comonomers is regulated to allow control over the polymerization. In general, the rate of addition of the pre-emulsion is usually such that at least one hour and usually two hours and more are required for the total addition.

In another embodiment, the latex emulsion is prepared by two-stage polymerization of two distinct monomer emulsions.

Conventional emulsion polymerization techniques may be used to produce the polymer of this invention. For example, ethylenically unsaturated monomers including the comonomer, the ionic monomer, multi-ethylenically unsaturated monomer and the crosslinking monomer may be emulsified with an anionic or nonionic dispersing agent, also referred to as a surfactant, using for example from 0.05 to 10% by weight of dispersing agent based on the weight of the total monomers. Combinations of anionic and nonionic dispersing agents may also be used.

A polymerization initiator should be added to the polymer emulsion composition. Exemplary initiators include, but are not limited to, the free radical type such as t-butyl hydroperoxide, sodium persulfate, potassium persulfate, ammonium persulfate, hydrogen peroxide, and mixtures thereof. Initiators are generally used in amounts of about 0.1% to 1% by weight, based on the total amount of monomers to be copolymerized. The polymerization temperature may be from 40-90° C., and may be optimized for the initiator system employed, as is conventional.

The coating composition of the present invention is manufactured using techniques known to those skilled in the art of manufacturing paint. Generally, for a waterborne composition, there are four stages in the manufacturing process: a pre-thin stage, a grind stage, a wash stage and a thindown stage.

In the pre-thin stage, the binder resin(s) is/are delivered to a thindown tank, along with defoamer and chase water. Typically, a primary binder resin and one or more secondary binder resins are used. The primary binder resin is present in a significantly greater amount than the secondary binder resins and is the primary source of formula adhesion. Examples of resins useful as the primary binder resin include acrylic latexes, vinyl acrylic latexes, ethylene vinyl acetate latexes and other resins known to those of ordinary skill in the art. The secondary binder resin(s) are present in much smaller volumes and are generally added to further enhance coating properties. Useful secondary binder resin(s) include, but are not limited to small particle size acrylic latexes. The binder resin(s), the chase water and defoamer are mixed together in the thindown tank under low shear conditions to form a pre-thin mixture.

In the grind stage, the pigments, such as calcium carbonate and dry titanium dioxide, as well as and any other dry raw materials that would not homogenize under low-shear mixing, are dispersed in a mill under high shear conditions into a vehicle comprising water and one or more dispersant(s), which may be anionic and/or nonionic. As is known in the art, nonionic dispersants are protective colloids that contain a hydrophilic group, such as polyethylene oxide, and a hydrophobic group, such as a hydrocarbon chain. Also, as is known in the art, anionic dispersants include low molecular weight molecules like amine alcohols (such as aminomethyl propanol), phosphate salts (such as tetrapotassiumpyrophosphate) and polymeric compositions of polycarboxylic acid or polycarboxylic acid copolymers. The process of dispersing breaks up agglomerates of particles to form a better particle distribution, and wets the particles with the vehicle. Such wetting inhibits the reagglomeration of the pigment particles. Examples of useful commercially available dispersants include TAMOL™ 165A from Rohm & Haas and AMP-95 from Dow.

In the wash stage, water is pumped into the mill to clean the mill and chase the grind paste into the thindown tank.

In the thindown stage, the grind paste, the chase water and the pre-thin mixture are blended together in the thindown tank under low shear conditions. Additional components may also be added, such as thickeners, coalescing aids, anti-settling agents, biocides, anti-foaming agents, freeze-thaw additives, colorants and the like. Flow control agents may also be added to control the flow and leveling properties of the composition. Such additional components are generally known to those of ordinary skill in the art and generally commercially available. For example, such additional components may include, but are not limited to additives such as nonionic urethane rheology modifiers, such as ACRYSOL™ RM rheology modifiers from DOW as thickeners; modified ureas, such as BYK 420 from Byk USA, or synthetic layered silicates, such as Laponite RD from Rockwood Additives Limited, as anti-settling agents; silicone or mineral oil type defoamers, glycols as freeze-thaw additives, or phthalocyanaine or iron oxide dispersions as colorants. Various types of these additives are commercially available. Other commercially available additives include butyl carbitol, and BIT-1, 2-benzisothiazolin-3-one. Once prepared, the coating composition concentrate is further let down with reducing solvent, water, and generally a small amount of coalescing solvent.

A final coating formulation typically also comprises a dispersing aid, thickening aids, a biocide, pigments, extenders and fillers, and a defoamer. The coating composition may contain pigment at pigment volume concentration in the range of 0 to 85%. For example, pigment volume concentrations in the range of 0 to 45% and 0 to 25% are common. The pigment volume concentration of a species of pigment particles is the percentage of the volume occupied by that species of pigment particles, based on the total volume of the dried coating prepared from the coating composition. Suitable pigments include inorganic pigments, organic pigments, and fillers such as titanium dioxide, iron oxide, zinc oxide, magnesium silicate, calcium carbonate, organic and inorganic colored pigments, aluminosilicates, silica, and various clays, Suitable organic pigments also include plastic pigments such as solid bead pigments and microsphere pigments containing voids or vesicles, and inorganic pigments. Examples of solid bead pigments include polystyrene and polyvinyl chloride beads.

It should be appreciated that the present invention is not limited in any manner to the foregoing method of manufacturing the coating composition. Other manufacturing methods may be used. For example, a continuous paint manufacturing method utilizing component slurries may be used to manufacture the coating composition of the present invention.

The coating composition of this invention may be applied onto substrates using conventional coating application methods, such as, for example, brushing, rolling, dipping, and spraying methods.

Coating formulations of the invention have a fast dry time, early water resistance and produce stain resistant coating films.

EXAMPLES

Table 1 shows the latex resin formulations for the latex resin of this invention as compared to a control latex resin. The following materials were added to a suitable reaction vessel for conventional emulsion polymerization.

TABLE 1

RESIN EXAMPLES

| | Resin Example 1 CONTROL Weight % (% BOTM) | Resin Example 2 Resin of this invention Weight % (% BOTM) |
|---|---|---|
| Charge: | | |
| Water | 31.73 | 31.73 |
| Water (surfactant dilute) | 2.01 | 2.01 |
| Anionic surfactant | 0.13 (0.32) | 0.13 (0.32) |
| Aqueous Ammonia | 0.02 | 0.02 |
| Initial Oxidizer: | | |
| Water | 0.67 | 0.67 |
| Ammonium persulfate | 0.08 (0.20) | 0.08 (0.20) |
| Monomer Charge: | | |
| Water | 12.46 | 12.46 |
| Anionic surfactant | 0.65 (1.58) | 0.65 (1.58) |

TABLE 1-continued

RESIN EXAMPLES

| | Resin Example 1 CONTROL Weight % (% BOTM) | Resin Example 2 Resin of this invention Weight % (% BOTM) |
|---|---|---|
| Aqueous Ammonia | 0.18 | 0.18 |
| Methacrylic Acid | 1.12 (2.72) | 0.72 (1.75) |
| HEMA Phosphate Ester Monomer | — | 0.72 (1.75) |
| Wet adhesion monomer | — | 1.24 (3.03) |
| Trifluorofunctional methacrylate | — | 0.78 (1.90) |
| Methyl Methacrylate | 19.50 (47.65) | 17.38 (42.47) |
| 2-Ethylhexyl acrylate | 20.31 (49.61) | 20.10 (49.10) |
| DI Water | 1.45 | 1.45 |
| Oxidizer | | |
| Water | 3.63 | 3.63 |
| Ammonium persulfate | 0.08 (0.20) | 0.08 (0.20) |
| Chase Oxidizer: | | |
| Water | 0.84 | 0.84 |
| t-Butyl hydroperoxide | 0.05 (0.08) | 0.05 (0.08) |
| Chase Reducer: | | |
| Water | 1.01 | 1.01 |
| Isoascorbic Acid | 0.02 (0.05) | 0.02 (0.05) |
| Aqueous Ammonia | 0.02 | 0.02 |
| Adjustment: | | |
| Aqueous Ammonia | 0.48 | 0.48 |
| Proxel GXL | 0.29 (0.19) | 0.29 (0.19) |
| Water | 3.27 | 3.27 |
| Weight % solids | 42.01 | 42.01 |

Additional resin examples, hereinafter Resin Examples 3 through 7, were formulated with varying amounts of fluoromonomer, phosphate monomer and wet adhesion monomer. The resin examples were then formulated into coating compositions as shown for Paint Examples 1 and 2 below.

Preparation of Coating Compositions

Paint Examples 1 and 2

Latex coating compositions were prepared utilizing resins prepared in Resin Examples 1 and 2, and then included into paints made by conventional methods known to those skilled in the art.

TABLE 2

PAINT EXAMPLES

| Component | Paint Example 1 (Control) (Weight Percent) | Paint Example 2 (Weight Percent) |
|---|---|---|
| Resin Example 1 (Control) | 32.28 | — |
| Resin Example 2 (Resin of this invention) | — | 32.28 |
| Byk 024[1] | 0.17 | 0.17 |
| Water | 13.95 | 13.95 |
| Min-U-Gel 400 Clay[2] | 0.43 | 0.43 |
| Proxel BD 20[3] | 0.09 | 0.09 |
| Tamol 165A[4] | 0.86 | 0.86 |
| Strodex PK-0VOC[5] Phosphate Ester | 0.34 | 0.34 |
| Rhodoline 697 Defoamer[6] | 0.17 | 0.17 |
| R-706 Titanium Dioxide[7] | 19.37 | 19.37 |
| Minex 4-Nepheline Syenite[8] | 19.11 | 19.11 |
| Polymeric extender | 4.73 | 4.73 |

TABLE 2-continued

PAINT EXAMPLES

| Component | Paint Example 1 (Control) (Weight Percent) | Paint Example 2 (Weight Percent) |
|---|---|---|
| Water | 5.45 | 5.45 |
| Acrysol RM-2020 NPR[9] | 1.03 | 1.03 |
| Loxanol CA 5120[10] | 1.05 | 1.05 |
| Polyphase PW-40LV[11] | 0.17 | 0.17 |
| Sodium Omadine | 0.09 | 0.09 |
| Acrysol Urethan thickener RM-8W[12] | 0.02 | 0.02 |
| Acrysol Urethane thickener RM-12W[13] | 0.38 | 0.38 |
| Byk 024[1] | 0.17 | 0.17 |
| Aqueous Ammonia | 0.09 | 0.09 |

[1]BYK-024 defamer from BYK USA Inc.
[2]Min-U-Gel 400 anti-settling agent from Active Minerals
[3]Proxel BD 20 preservative from Lanza Microbial Control
[4]Tamol 165A dispersant from DOW
[5]Strodex PK-0VOC surfactant from Ashland Specialty Ingredients
[6]Rhodoline 697 defoamer from Solvay Novecare
[7]R-706 Titanium Dioxide pigment from Chemours
[8]Minex-4 extender pigment from Unimin
[9]Acrysol RM-2020 NPR rheology modifier from DOW
[10]Loxanol CA 5120 coalescing agent from BASF
[11]Polyphase PW-40LV fungicide from Troy Chemical Corporation
[12]Acrysol RM-8W rheology modifier from DOW
[13]Acrysol RM-12W rheology modifier from DOW Test Results The washability of the coating compositions was tested by coating Leneta panels with 7 mil wet film thickness, and ambient cured over a 5 day period. The panels were washed for 50 cycles using a GARDCO Washability and Wear Tester—Linear Motion Test Equipment. The results were quantified (ΔE) using an X-rite VS450 non-contact spectrophotometer—CIE L*A*B*, 6 mm aperture.

Table 3 provides a quantitative summary of washability and wear testing results utilizing the resin formulation of Example 2 having the phosphate monomer, and varying the fluoromonomer and the wet adhesion monomer and then prepared as a coating composition as in Paint Example 2. As can be seen in Table 3, the performance of the coating in Paint Examples 2 through 7 is much improved for washability when these monomers are employed in the coating system.

TABLE 3

WASHABILITY RESULTS

| Monomers (% monomer wt) | Resin Ex. 1 (Control) | Resin Ex. 2 | Resin Ex. 3 | Resin Ex. 4 | Resin Ex. 5 | Resin Ex. 6 | Resin Ex. 7 |
|---|---|---|---|---|---|---|---|
| 2-Ethylnexylaorylate | 48.20 | 49.10 | 48.40 | 43.50 | 49.00 | 43.50 | 47.80 |
| Methylmethaerylate | 47.60 | 44.70 | 42.20 | 40.10 | 40.80 | 42.00 | 42.80 |
| HEMA Phosphate Monomer | — | 1.75 | 1.75 | 1.75 | 1.75 | 1.75 | 1.75 |
| Fluorester | — | 1.90 | — | — | 6.30 | 10.00 | 3.90 |
| 8-FM | — | — | 1.30 | 6.20 | — | — | — |
| Wet Adhesion Monomer (I) | — | 0.76 | — | — | 0.32 | 0.97 | 2.00 |
| Wet Adhesion Monomer (II) | — | — | 0.70 | 1.89 | — | — | — |

Results

| | Paint Ex. 1 | Paint Ex. 2 | Paint Ex. 3 | Paint Ex. 4 | Paint Ex. 5 | Paint Ex. 6 | Paint Ex. 7 |
|---|---|---|---|---|---|---|---|
| ΔE Mustard | 8.6 | 0.9 | 1.24 | 0.87 | 1.73 | 1.32 | 1.35 |
| ΔE Crayon | 7.25 | 2.43 | 3.66 | 2.41 | 0.31 | 0.55 | 0.18 |
| ΔE Lipstick | 8.64 | 10.7 | 5.33 | 0.78 | 2.45 | 1.21 | 2.04 |
| ΔE Consumer Union | 4.59 | 0.7 | 3.05 | 1.15 | 0.33 | 0.52 | 0.14 |

What is claimed is:

1. A stain resistant latex emulsion composition comprising:
   (a) 0-60 weight percent of a styrene-based monomer,
   (b) 10 to 90 weight percent of one or more (meth)acrylic monomers;
   (c) 0-60 weight percent of a vinyl-based monomer;
   (d) 0.5 to 10 weight percent of, chlorotrifluoroethylene or a fluorine monomer having a general chemical structure of:

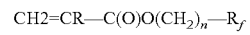
   $$CH_2=CR-C(O)O(CH_2)_n-R_f$$

wherein R is hydrogen or methyl, $n$ is an integer in the range of from 0-20, and $R_f$ is a fluoroalkyl group having in the range of 1 to 20 carbon atoms;
   (e) 0.1 to 5% by weight, based on total monomer weight, of a polymerizable phosphate-functional monomer;
   (f) 0.1 to 8% by weight of a wet adhesion monomer; all based on the total weight of monomers.

2. The latex emulsion composition of claim 1, wherein the fluorine-containing unsaturated monomer is selected from the group consisting of 2,2,2-trifluoroethyl (meth)acrylate, perfluoromethyl ethyl (meth)acrylate, perfluoroethyl ethyl methacrylate, perfluorobutyl ethyl (meth)acrylate, perfluoropentyl ethyl (meth)acrylate, perfluorohexyl ethyl (meth) acrylate, perfluorooctyl ethyl (meth)acrylate, perfluorodecyl ethyl (meth)acrylate, perfluorolauryl ethyl (meth) acrylate, perfluorostearyl ethyl (meth)acrylate or combinations thereof.

3. The latex emulsion composition of claim 1, wherein the polymerizable phosphate-functional monomer is selected from the group consisting of allyl phosphate, mono- or diphosphate of bis(hydroxy-methyl) fumarate or itaconate, derivatives of (meth)acrylic acid phosphate esters, phosphonate functional monomers, 1,2-ethylenically unsaturated (hydroxy)phosphinylalkyl (meth)acrylate monomers, dihydrogen phosphate monomers, 2-phosphoethyl (meth)acrylate, 2-phosphopropyl (meth)acrylate, 3-phosphopropyl (meth)acrylate, 3-phospho-2-hydroxypropyl (meth)acrylate.

4. The latex emulsion composition of claim 1, wherein the polymerizable phosphate monomer is selected from the group consisting of: (a) dihydrogen phosphate-functional monomers, or (b) one or more phosphate monomers having at least one diester group; or (c) one or more phosphonate monomers, or (d) ethylenically unsaturated (hydroxy) phosphinyl alkyl (meth)acrylate monomers; or (e) phosphoalkyl (meth)acrylates; or (f) phosphoalkyloxy (meth)acrylates, where (meth)acrylate designates methacrylate or acrylate; or a combination thereof.

5. The latex emulsion of claim 4, wherein the phosphonate monomer is selected from the group consisting of mono or bis-(hydrocarbyl or halohydrocarbyl)vinyl or allylphosphonates.

6. The latex emulsion of claim 4, wherein the ethylenically unsaturated (hydroxy) phosphinyl alkyl (meth)acrylate monomer is (hydroxy)phosphinylmethyl methacrylate.

7. The latex emulsion of claim 4, wherein the phosphoalkyl (meth)acrylate monomer is selected from the group consisting of: 2-phosphoethyl (meth)acrylate, 2-phosphopropyl (meth)acrylate, 3-phosphopropyl (meth)acrylate, and 3-phospho-2-hydroxypropyl (meth)acrylate.

8. The latex emulsion of claim 4, wherein the phosphoalkyloxy (meth)acrylate monomer is selected from the group consisting of: phospho-ethylene glycol (meth)acrylate, phosphodi-ethylene glycol (meth)acrylate, phosphotriethylene glycol (meth)acrylate, phosphopropylene glycol (meth)acrylate, phosphodipropylene glycol (meth)acrylate, phosphotri-propylene glycol (meth)acrylate where (meth)acrylate designates methacrylate or acrylate.

9. The latex emulsion composition of claim 1, wherein the wet adhesion monomer is selected from the group consisting of ethylenically unsaturated amino-, urea- and ureido-functionalized monomers.

10. The latex emulsion of claim 4, wherein the phosphonate monomer is a vinyl phosphonate monomer or allyl phosphonate monomer.

11. The latex emulsion of claim 4, wherein the phosphonate monomer is selected from the group consisting of mono(ethyl)vinyl acid phosphonate, mono(butyl)vinyl acid phosphonate, mono(octyl)vinyl acid phosphonate, mono(cyclohexyl)vinyl acid phosphonate, mono(phenyl)vinyl acid phosphonate, mono(benzyl)vinyl acid phosphonate, mono (omega-chloroethyl)vinyl acid phosphonate, mono(omega-chlorooctyl) vinyl acid phosphonate, bis (ethyl) vinyl phosphonate, bis(butyl) vinyl phosphonate, bis (benzyl) vinyl phosphonate, bis(omega-chloroethyl)vinyl phosphonate, bis (omegachlorobutyl)vinyl phosphonate, bis(omega-chloroethyl) allyl phosphonate, bis(benzyl)allyl phosphonate and bis(cyclohexyl) allyl phosphonate.

12. The latex emulsion of claim 1, wherein the wet adhesion monomer is selected from the group consisting of dimethylaminoethyl acrylate and methacrylate, dimethylaminopropyl acrylate and methacrylate, 3-dimethylamino-2,2-dimethylpropyl-1-acrylate and methacrylate, 2-N-morpholinoethyl acrylate and methacrylate, 2-N-piperidinoethyl acrylate and methacrylate, N-(3-dimethylaminopropyl) acrylamide and methacrylamide, N-(3-dimethylamino-2, 2-dimethylpropyl) acrylamide and methacrylamide, N-dimethylaminomethyl acrylamide and methacrylamide, N-dimethylaminomethyl acrylamide and methacrylamide, N-(4-morpholino-methyl) acrylamide and methacrylamide, vinylimidazole, vinylpyrrolidone, N-(2-methacryloyloxyethyl) ethylene urea, N-(2-methacryloxyacetamidoethyl)-N, N'-ethyleneurea, allylalkyl ethylene urea, N-methacrylamidomethyl urea, N-methacryoyl urea, 2-(l-imidazolyl) ethyl methacrylate, N-(methacrylamido)ethyl ethylene urea and allyl ureido monomer.

* * * * *